United States Patent
Brown (10) Patent No.: US 10,342,217 B2
(45) Date of Patent: Jul. 9, 2019

(54) MULTIPURPOSE CANINE CAMERA (MPCC)

(71) Applicant: BAE SYSTEMS Information and Electronic Systems Integration, Inc., Nashua, NH (US)

(72) Inventor: Steven J. Brown, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 339 days.

(21) Appl. No.: 15/158,853

(22) Filed: May 19, 2016

(65) Prior Publication Data

US 2017/0332601 A1    Nov. 23, 2017

(51) Int. Cl.
| | |
|---|---|
| *A01K 15/00* | (2006.01) |
| *A01K 15/02* | (2006.01) |
| *A01K 29/00* | (2006.01) |
| *H04R 1/02* | (2006.01) |
| *H04N 5/232* | (2006.01) |
| *H04N 5/225* | (2006.01) |
| *H04N 5/33* | (2006.01) |

(52) U.S. Cl.
CPC .......... *A01K 15/021* (2013.01); *A01K 29/005* (2013.01); *H04N 5/2251* (2013.01); *H04N 5/23206* (2013.01); *H04N 5/23296* (2013.01); *H04N 5/33* (2013.01); *H04R 1/028* (2013.01)

(58) Field of Classification Search
CPC ...... A01K 15/021; A01K 15/02; A01K 29/00; A01K 29/005; A01K 11/004; A01K 11/006; A01K 11/008; H04N 7/148; H04N 7/14; H04N 5/23203
See application file for complete search history.

(56) References Cited

U.S. PATENT DOCUMENTS

| | | | | |
|---|---|---|---|---|
| 4,651,678 A | * | 3/1987 | Kime | A01K 15/027 54/71 |
| 4,765,276 A | * | 8/1988 | Kime | A01K 15/027 340/12.5 |
| 6,782,847 B1 | * | 8/2004 | Shemesh | A01K 15/02 119/718 |
| 2003/0025792 A1 | | 2/2003 | Eberhard | |
| 2006/0146122 A1 | * | 7/2006 | McDonald | H04N 21/2743 348/14.03 |
| 2006/0201432 A1 | * | 9/2006 | Pratt | A01K 29/00 119/51.02 |
| 2012/0242697 A1 | * | 9/2012 | Border | G02B 27/0093 345/633 |
| 2013/0319337 A1 | | 12/2013 | Davis | |
| 2014/0352632 A1 | * | 12/2014 | McLaughlin | A01K 11/008 119/721 |
| 2017/0318789 A1 | * | 11/2017 | Pantazes | A01K 15/021 |

\* cited by examiner

*Primary Examiner* — Trinh T Nguyen
(74) *Attorney, Agent, or Firm* — Davis & Bujold, PLLC; Scott J. Asmus (57) ABSTRACT

The system and method of real-time, two-way communication between a handler and a canine using RF frequencies. A multipurpose canine camera system with audio, visual, and thermal capabilities that transmits securely between a handler and a canine through hard structures and over long distances. The canine portion having one or more sensors. The sensors may include location, monitors for canine vital signs, heat signatures, chemical signature detection, and many others. The handler portion having a display configured to control the camera on the canine portion.

13 Claims, 6 Drawing Sheets

MULTIPURPOSE CANINE CAMERA (MPCC)

FIELD OF THE DISCLOSURE

The present disclosure relates to camera systems and more particularly to a multipurpose canine camera system.

BACKGROUND OF THE DISCLOSURE

Working dogs are employed around the world for a variety of purposes and have been used for law enforcement and the like since at least the middle Ages. The safety of canine officers and their human handlers is of great ongoing concern. Utilizing dogs effectively and to their greatest potential while minimizing the loss of any personnel creates unique challenges.

SUMMARY OF THE DISCLOSURE

It has been recognized that current canine camera systems are lacking in many ways that leave canine officers and their human colleagues at risk. Current systems lack the functionality to confront both known and unknown challenges resulting in missed opportunities and unnecessary losses.

One aspect of the present disclosure is a system for real-time, two-way communication between a handler and a canine comprising, a handler portion comprising, a display, wherein the display provides for control of the camera of the canine portion including pan/tilt and zoom capabilities; a microphone and one or more speakers; and a power source; a canine portion comprising, a vest; one or more cameras mounted on the vest, wherein the cameras include thermal imaging capabilities and are configured to be operated by the handler portion; a microphone and one or more speakers; one or more sensors; and a power source; two or more multi-channel transmitters, wherein a first transmitter is mounted on the canine portion and is configured to transmit signals from the canine portion to the handler portion and a second transmitter is mounted on the handler portion and is configured to transmit signals from the handler portion to the canine portion, the transmitters use RF frequencies; and two or more multi-channel receivers, wherein a first receiver is mounted on the canine portion and is configured to receive signals from the handler portion and a second receiver is mounted on the handler portion and is configured to receive signals from the canine portion, the receivers use RF frequencies.

In one embodiment of the system the one or more sensors comprises GPS. In one embodiment of the system the one or more sensors comprises sensors for monitoring the vital signs of the canine.

In one embodiment of the system the transmitters can transmit signals and the receivers can receive signals over long distances and do not require line-of-sight. In one embodiment of the system the long distance is between 300 and 500 meters. In one embodiment of the system the signals can be transmitted and received through hard structures. In one embodiment of the system the hard structure is a tunnel.

In one embodiment of the system the one or more transmitters and one or more receivers are combined into one or more transceivers.

In one embodiment of the system the display is a touch screen. In one embodiment of the system the display is incorporated into ballistic glasses.

In one embodiment of the system the power sources are rechargeable.

In one embodiment of the system the multi-channel system automatically selects the frequency to use for two-way communication between handler and canine.

In one embodiment of the system, it further comprises an IR strobe on the canine portion. In one embodiment of the system, it further comprises a camera mounted on a chest of a canine to provide 360° views.

Another aspect of the present disclosure is a method of real-time, two-way communication between a handler and a canine comprising, providing a handler portion comprising, a display; a microphone and one or more speakers; and a power source; providing a canine portion comprising, one or more cameras mounted on a vest; a microphone and one or more speakers; one or more sensors; and a power source; providing two or more multi-channel transmitters, wherein a first transmitter is mounted on the canine portion and is configured to transmit signals from the canine portion to the handler portion and a second transmitter is mounted on the handler portion and is configured to transmit signals from the handler portion to the canine portion, the transmitters use RF frequencies; providing two or more multi-channel receivers, wherein a first receiver is mounted on the canine portion and is configured to receive signals from the handler portion and a second receiver is mounted on the handler portion and is configured to receive signals from the canine portion, the receivers use RF frequencies; transmitting audio signals from the canine portion to the handler portion; transmitting sensor signals from the canine portion to the handler portion; transmitting video signals from the canine portion to the handler portion; receiving, at the handler portion, signals transmitted from the canine portion; transmitting audio signals from the handler portion to the canine portion; receiving, at the canine portion, signals transmitted from the handler portion; recording and storing signals from the canine portion and the handler portion; controlling the camera on the canine portion using the display on the handler portion; determining the RF frequency for two-way communication between the canine portion and the handler portion; monitoring vital signs of a canine using the one or more sensors; monitoring the position of a canine using the one or more sensors; and collecting data about the area where a canine is using the one or more sensors.

Another aspect of the present invention is a multipurpose canine camera system comprising, a vest; one or more cameras mounted on the vest, wherein the cameras include thermal imaging capabilities and are configured to be operated remotely; a microphone and one or more speakers; one or more sensors; a power source; one or more multi-channel transmitters, wherein the transmitter is mounted on the vest and is configured to transmit signals using RF frequencies; and one or more multi-channel receivers, wherein the receiver is mounted on the vest and is configured to receive signals from a handler using RF frequencies.

In one embodiment of the system the one or more sensors comprises GPS. In one embodiment of the system the one or more sensors comprises sensors for monitoring the vital signs of the canine.

In one embodiment of the system the transmitter can transmit signals and the receiver can receive signals over long distances and do not require line-of-sight. In one embodiment of the system the long distance is between 300 and 500 meters. In one embodiment of the system the signals can be transmitted and received through hard structures.

In one embodiment of the system the one or more transmitters and one or more receivers are combined into one or more transceivers.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

The multipurpose canine camera system of the present disclosure is a light-weight, battery operated, rapidly deployable communication system for use with canines. In certain embodiments, the communication system includes a thermal imager that feeds live streaming video to any wireless device. The system of the present disclosure has numerous practical applications including threat identification of all kinds and search and rescue operations.

In certain embodiments, the canine communication system of the present disclosure is used in threat identification. In certain embodiments, the system is used for explosive and/or drug detection. In certain embodiments, the canine communication system of the present disclosure is used in tracking and/or search and rescue missions. In certain embodiments, the canine communication system is used in guarding and/or prisoner transport operations. In certain embodiments, the canine communication system is used in apprehension and/or extraction operations. In certain embodiments, the canine communication system is used in rappelling. In certain embodiments, the canine communication system of the present disclosure is used in training and/or agility exercises.

The system of the present disclosure addresses communications from canine to handler and from handler to canine. In certain embodiments of the system, the canine portion of the system has a variety of sensors as well as receivers and transmitters. In certain embodiments of the system, the handler portion of the system has a display as well as receivers and transmitters for real-time, two-way communication with the canine. In certain embodiments, audio, video, and other data is recorded and/or stored. In certain embodiments, the system saves information on microSD or similar on-board media.

Figure 1:
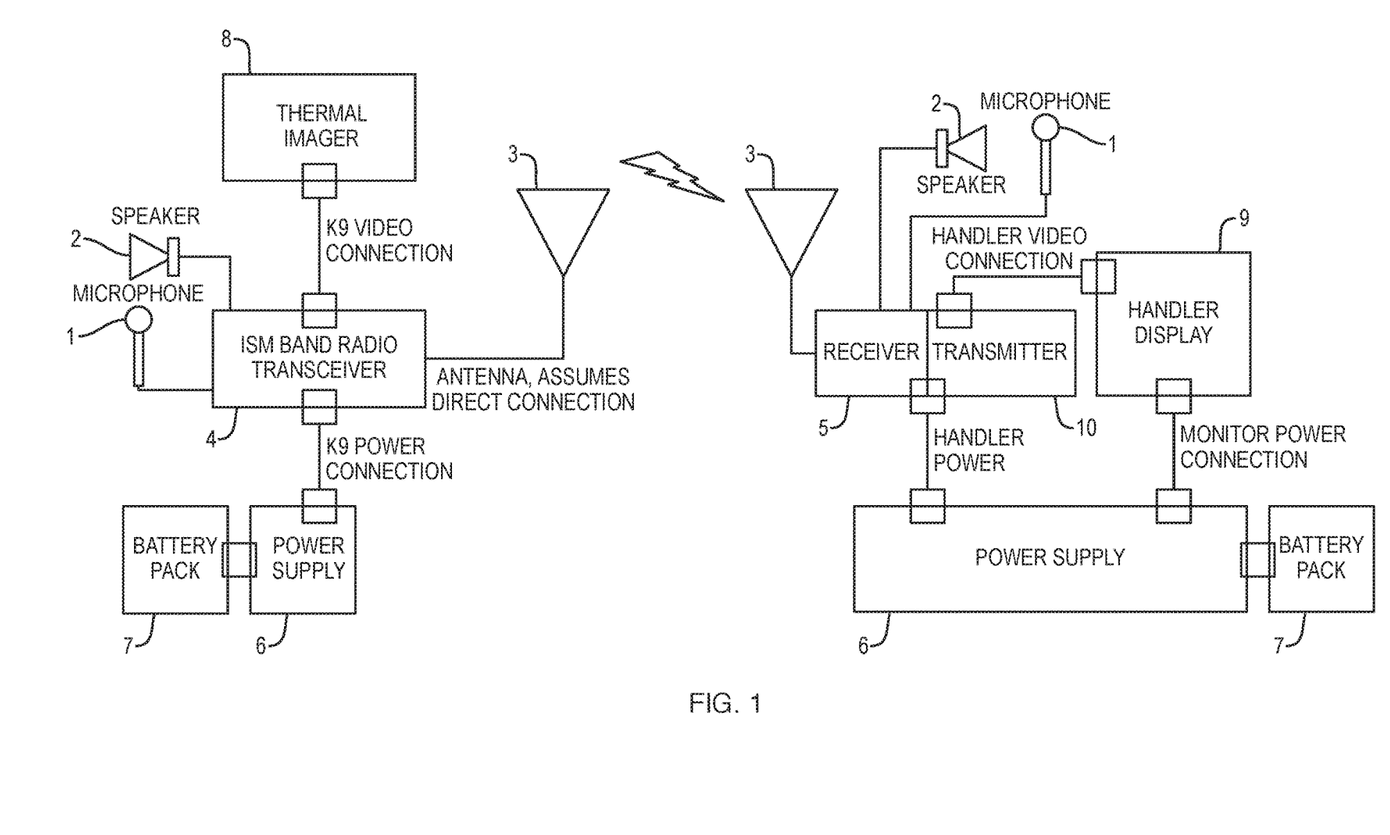
FIG. 1 shows a diagram of one embodiment of the multipurpose canine camera system of the present disclosure.

Referring to FIG. 1, a diagram of one embodiment of the multipurpose canine camera system of the present disclosure is shown. More particularly, the canine portion and the handler portion will share certain components including a microphone 1, one or more speakers 2, and an antenna 3. In certain embodiments, the antenna assumes direct connection between the antenna of the encoder to display device. In certain embodiments, the handler and/or canine portion comprises a transceiver 4. In certain embodiments, the handler and/or canine portion comprises a receiver 5 and a transmitter 10. In certain embodiments, the system utilizes bands of RF communication frequencies. In certain embodiments, the handler and/or canine portion comprises a power supply 6 and/or a battery pack 7. In certain embodiments, some or all of the components within the canine and/or handler portion are connected electrically with cables. In certain embodiments, some or all of the components within the canine and/or handler portion are connected wirelessly. In certain embodiments of the multipurpose canine camera system of the present disclosure the canine portion comprises a thermal imager 8. In certain embodiments of the multipurpose canine camera system of the present disclosure the handler portion comprises a display. In certain embodiments of the present disclosure, the canine and/or handler portion comprises a component configured to record and/or store information that is collected, transmitted and/or received within the system.

In certain embodiments of the canine communication system, the communication system can penetrate "hard structures." In certain embodiments, the hard structures include tunnels, walls, glass, and the like. In certain embodiments, the system uses near field magnetic communication. In certain embodiments of the system, the system provides a mechanism to automatically or manually input frequency preferences based on terrain/needs of the handler's deployment. In some embodiments of the present disclosure, the system can allow for changes of frequency based off user and/or terrain requirements.

In certain embodiments, the system provides two-way communication. In certain embodiments, the system uses RF frequencies for communication. In certain embodiments, the RF frequency ranges from about 3 Hz to about 300 GHz. In certain embodiments, the RF frequency ranges from about 3 Hz to about 3 kHz. In certain embodiments the RF frequency ranges from about 3 kHz to about 3 MHz. In certain embodiments the RF frequency ranges from about 3 MHz to about 300 MHz. In certain embodiments the RF frequency ranges from about 300 MHz to about 300 GHz.

In certain embodiments of the canine communication system, the communication system does not require line of sight for communication. In certain embodiments, the system has distance over which it operates. In certain embodiments, the distance extends to about 300 to 500 meters in open or wooded terrain. In certain embodiments, the system can expand communication effectiveness to include communication through caves or other "hard structures." It is understood that most work done by municipalities is done on long lead, which is about a 30-50' lead. Most work done by military personnel is done off lead. The system of the present disclosure is useful in numerous civilian and military applications.

In certain embodiments, the canine portion of the system detects ionizing radiation. In certain embodiments, the canine portion of the system captures images utilizing the ultraviolet range of the electromagnetic spectrum. In certain embodiments, the canine portion of the system captures images utilizing the visible range of the electromagnetic spectrum. In certain embodiments, the canine portion of the system captures images utilizing the infrared range of the electromagnetic spectrum. In certain embodiments, the canine portion of the system captures images in more than one region of the electromagnetic spectrum. In certain embodiments, the canine portion of the system captures images through glass, and through other obstructions. In certain embodiments, the canine portion of the system detects digital chemical signatures. In certain embodiments, the system utilizes thermal imaging capabilities with edge detect. In certain embodiments, the system utilizes heat signature identification capabilities of particular use in search and rescue applications.

Figure 2A:
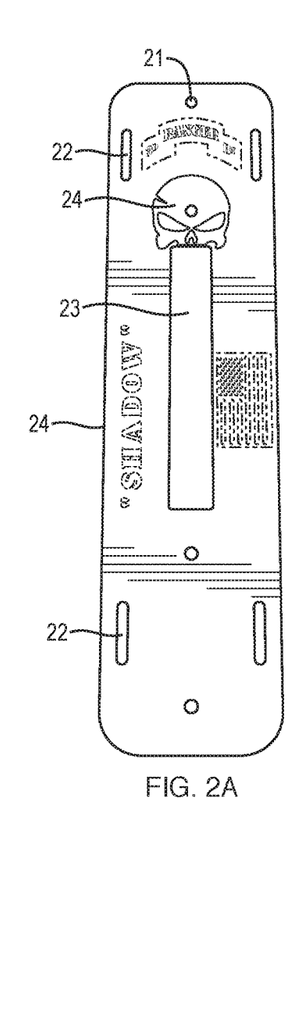
FIG. 2A shows one embodiment of mounting hardware for the multipurpose canine camera system of the present disclosure.
Figure 2B:
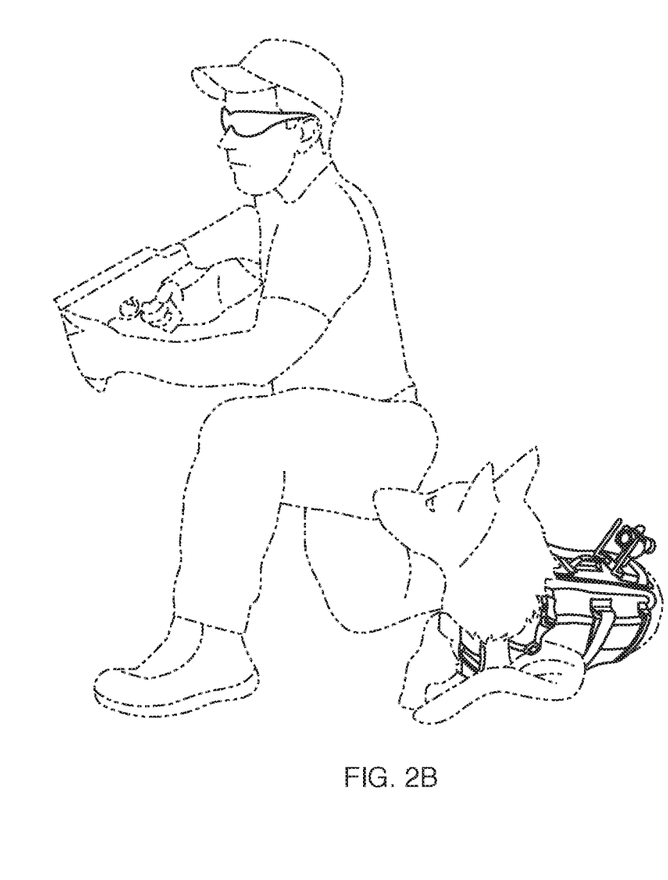
FIG. 2B shows a picture of handler with a canine wearing one embodiment of the multipurpose canine camera system of the present disclosure.
Figure 2C:
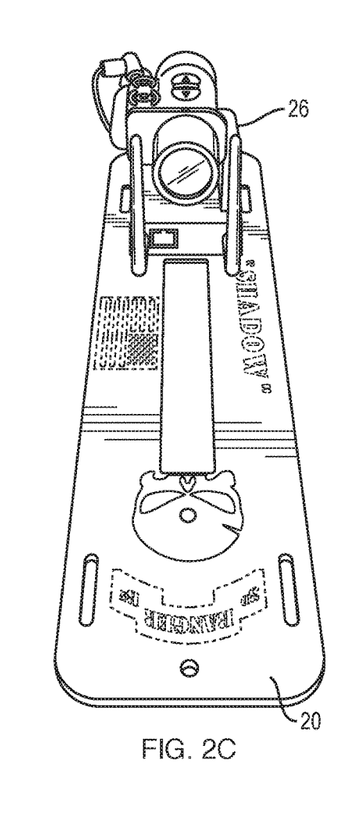
FIG. 2C shows one embodiment of the mounting hardware with a multipurpose canine camera system of the present disclosure.

Referring to FIG. 2A and FIG. 2C, one embodiment of mounting hardware for the multipurpose canine camera system of the present disclosure is shown. More particularly, in certain embodiments the system comprises mounting hardware 20 for use with existing canine vests. In certain embodiments, the mounting hardware 20 comprises vest attachment holes 22. In certain embodiments, the mounting hardware 20 comprises decals or other identifiable markings or decoration 24. In certain embodiments, the mounting hardware 20 comprises component attachment regions 21 for attaching a variety of components 26. It is understood that there are many methods of attachment known to those of skill in the art and that would be suitable to attach components of the present disclosure to mounting hardware or directly to a canine vest.

Referring to FIG. 2B, a picture of handler with a canine wearing one embodiment of the multipurpose canine camera system of the present disclosure is shown. More particularly, in certain embodiments of the canine communication system of the present disclosure, the system is modular, or made up of separate components. In certain embodiments, the system is manufactured at a reduced cost. In certain embodiments, the system is used by military and civilian personnel. In certain embodiments, the components can be reversibly attached to a canine vest. In certain embodiments, the components can be integrated into a canine vest. In certain embodiments, the modular components are designed to withstand harsh conditions including, but not limited to, extreme temperatures, water, vibration and sudden impact.

Current canine cameras have mounts that wobble as the dog moves as seen in U.S. Pat Pub. 2003/0025792. There, the system is mounted on a custom made silicon cap. These systems can cause abrasions and aggravation to the canine. The systems also have issues with vibration and image instability.

In certain embodiments of the multipurpose canine camera of the present disclosure, the canine portion of the system is designed as a minimalist vest capable of mounting components on the top, right, and left side of the vest. In certain embodiments, the modular components may be attached using cobra buckles. In certain embodiments, the vest in comprised of vented nylon with silicon coating. It is understood that many reversible attachment methods would be applicable in this system. In certain embodiments of the present disclosure, the canine portion is mounted only on or around the canine's body, not on the canine's head. It is important for the handler to be able to see the canine's head as many of the canine's signals, or body language, involve quick and subtle head movements that would be missed if equipment was mounted on their head. For example, odor takes the path of least resistance and creates a 'scent cone' that emanates from the source of the odor. When a canine alerts to a scent it often has a quick and slight "head throw" that a handler needs to detect as the team moves quickly into an area. In certain embodiments, the system includes image stabilizing technology to accommodate for motion caused by running, jumping, and the like. In certain embodiments, the canine portion is designed ergonomically and has even weight distribution about the canine. In certain embodiments, battery compartments are located on either side of the system to distribute the bulk and the weight of the system more evenly.

In certain embodiments of the canine communication system of the present disclosure, the overall weight of the system is minimized. In certain embodiments of the canine communication system of the present disclosure lightweight materials are used including, but not limited to, titanium, aluminum, or carbon fiber for the frame of the camera. In certain embodiments, the material is lightweight, easily worked, and creates portions of the frame that are hollow to provide for storage of wires or loose parts, as well as assisting in buoyancy and waterproofing of the component. In certain embodiments, the system is mil-spec. In certain embodiments, the system is accompanied by a locking case for ease of transport.

In certain embodiments, the bulk is removed from the canine portion by using a minimalist imaging solution. This would effectively decrease the weight of the imaging portion of the system, while simultaneously enabling the system to be less cumbersome for the canine. In certain embodiments, the handler portion would contain frequency boosting, network encryption, and as much of the other functions of the system as possible in a properly sized system so that the weight and bulk is distributed between handler and canine to facilitate ease of maneuverability of the canine.

Figure 3:
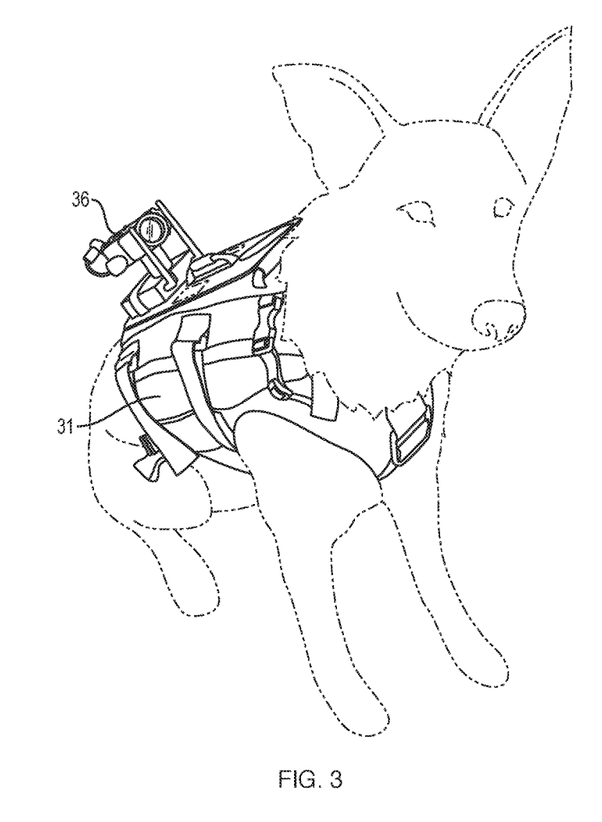
FIG. 3 shows a picture of the front view of a canine wearing one embodiment of the multipurpose canine camera system of the present disclosure.

Referring to FIG. 3, a picture of the front view of a canine wearing one embodiment of the multipurpose canine camera system of the present disclosure is shown. More particularly, a component 36 is mounted onto a vest 31. It is easy to see that the canine is afforded a greater range of motion and comfort when wearing the system of the present disclosure. In certain embodiments, the system comprises a chest portion for mounting additional components (not shown). In certain embodiments, components may be mounted on a collar (not shown).

Figure 4A:
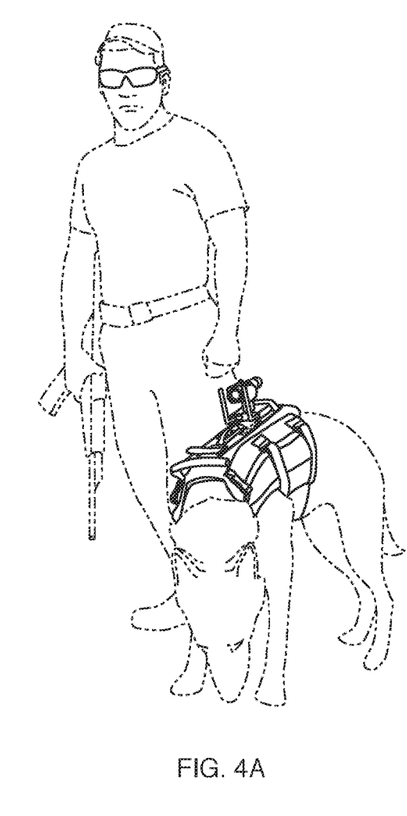
FIG. 4A shows a picture of handler with a canine wearing one embodiment of the multipurpose canine camera system of the present disclosure.
Figure 4B:
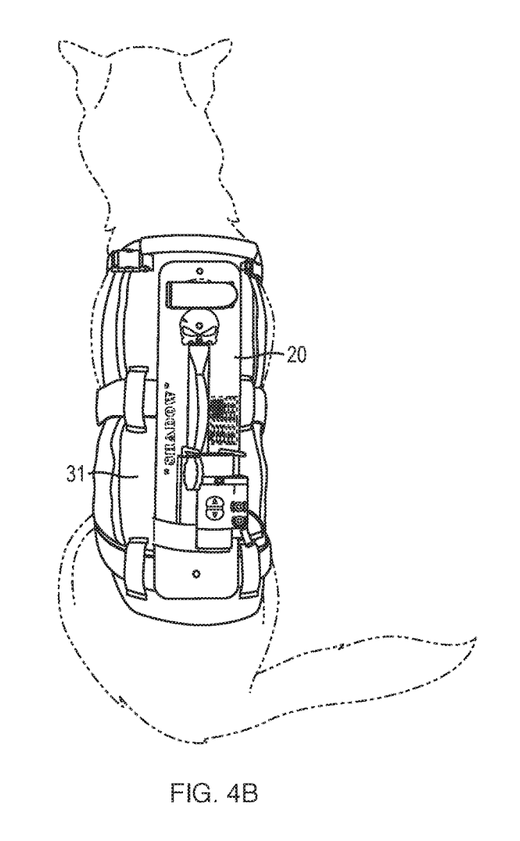
FIG. 4B shows a picture of the back view of a canine wearing one embodiment of the multipurpose canine camera system of the present disclosure.

Referring to FIG. 4A, a picture of handler with a canine wearing one embodiment of the multipurpose canine camera system of the present disclosure is shown. Referring to FIG. 4B, a picture of the back view of a canine wearing one embodiment of the multipurpose canine camera system of the present disclosure is shown. More particularly, a component 36 is mounted on mounting hardware 20 on a vest 31.

Figure 5:
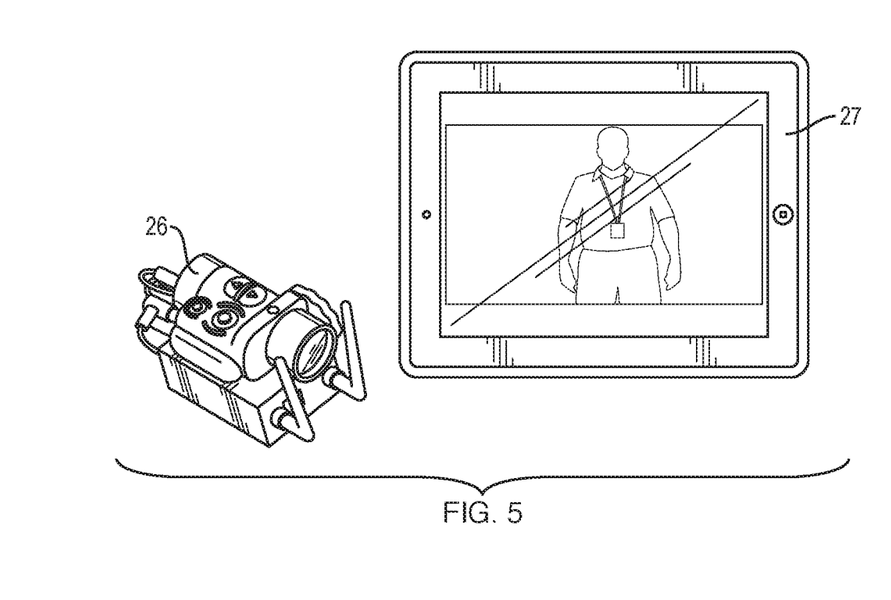
FIG. 5 shows a camera and a display of one embodiment of the multipurpose canine camera system of the present disclosure.

Referring to FIG. 5, a camera and a display of one embodiment of the multipurpose canine camera system of the present disclosure is shown. More particularly, in certain embodiments of the multipurpose canine camera system of the present disclosure the handler's display 27 is a tablet or some other mobile device such as a cellular phone. In certain embodiments, the canine portion if the multipurpose canine camera system is housed in a single component 26.

Figure 6:
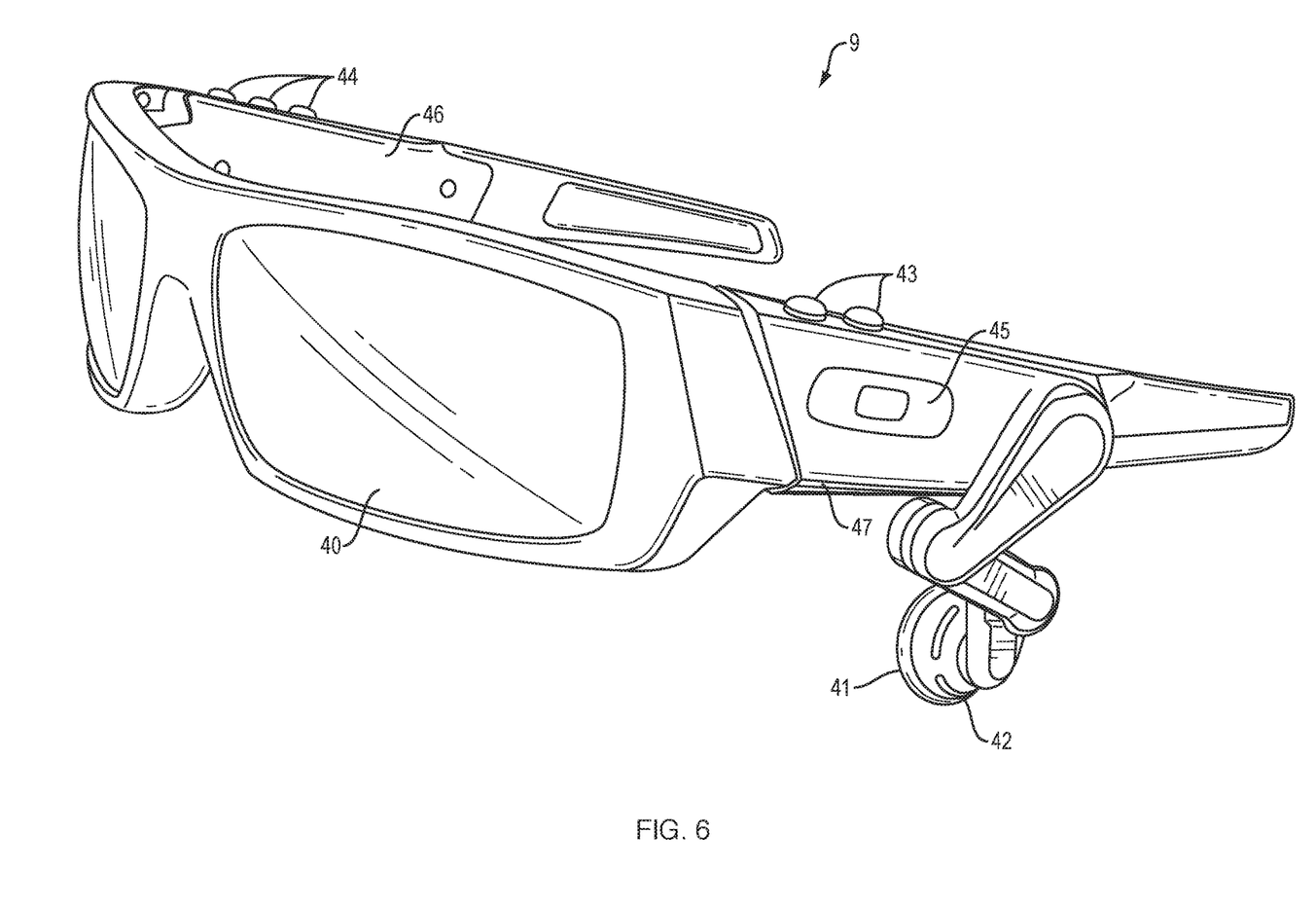
FIG. 6 shows a display of one embodiment of the multipurpose canine camera system of the present disclosure.

Referring to FIG. 6, a display of one embodiment of the multipurpose canine camera system of the present disclosure is shown. More particularly, in certain embodiments of the multipurpose canine camera system of the present disclosure the handler's display 9 is a pair of ballistic Oakley sunglasses, or the like. In certain embodiments, the ballistic glasses comprise impact resistant or shatter proof lenses 40. In certain embodiments, the display is present in or on the lenses. In certain embodiments of the display, shown here as glasses, volume controls 43 for the speaker and/or microphone are present. In certain embodiments, a power switch for the canine portion is on the display 45. In certain embodiments, zoom, pan/tilt and other camera controls 44 are present on the display. In certain embodiments, a power source 46 is present in the display. In certain embodiments, data storage and/or recording capabilities 47 are present in the display. In certain embodiments, the display comprises a speaker 41. In certain embodiments, the display comprises a microphone 42.

In certain embodiments, the handler portion of the system has a display for viewing the images and/or data collected at the canine portion of the system. In certain embodiments, the display is a touch screen. In certain embodiments, the handler is able to move the camera in any direction as well as zoom in and out. This would be extremely beneficial because in the case that the canine indicates on an explosive, all you see with current canine cameras is the ceiling (canine sits down, camera is stationary, so there's nothing to see but the ceiling). A handler needs to be able to take a look around and see what the canine may or may not be indicating on. It would also be extremely useful if the canine was "on bite." Knowing if the target that the canine is latched to has a gun or an accomplice in the room (and being able to give commands to this person and/or to the canine via the speaker) would keep personnel out of the line of fire. In certain embodiments, the system utilizes reverse detection of tilt. In certain embodiments, a panomorph camera with 180 degree field of view is used. In certain embodiments, the canine imaging system provides 360 views. In certain embodiments, more than one camera is added to the system to provide a wider field of view. In certain embodiments, a camera is added to the canine's collar. In certain embodiments, a camera is mounted on the chest piece of a canine vest to provide more complete images and to mitigate blind spots.

In certain embodiments of the system, the system provides the GPS location of the canine to the handler. In certain embodiments of the system, the system detects and transmits the vital signs of the canine to the handler. In certain embodiments, a pacemaker battery is used to increase battery life while decreasing weight. In certain embodiments, the sensor for the detection of the canine's vital signs is surgically implanted. In certain embodiments, the GPS and vital sign functionalities are paired. Having the GPS location paired with vital signs is beneficial in the case that a canine is lost during a track. Knowing where the canine is, and whether or not the canine is alive would prevent going after the canine un-necessarily. Especially if the canine fell into enemy hands and the enemy had an ambush waiting. In certain embodiments, the canine vital signs include respiration, heart rate, core temperature, blood pressure and the like.

In certain embodiments, the system includes Elektrobit, a miniaturized mil-spec replacement for Teradek, or the like for creating an encrypted communication network. In certain embodiments, the system includes Silva's radios or the like to penetrate concrete from great distances. In certain embodiments, the system includes miniaturized cameras and radio solutions. In certain embodiments, the system includes tactical headsets, push to talk headsets, or the like. In certain embodiments, the system includes ODU connectors or the like to provide for a wide range of applications including the transmission of power, signal, data and media.

In certain embodiments of the multipurpose canine camera system, there is a multiple channel interface between the handler and the canine. In certain embodiments, the multiple channels accommodate audio, video, and other forms of data. In certain embodiments, the system has an IR Strobe or the like to help locate the canine in low light applications. In certain embodiments, the system has a privacy/stealth screen on the handler's display or monitor. In certain embodiments, the system has a rechargeable battery option. In certain embodiments, the system has a solar battery option. In certain embodiments of the multipurpose canine camera system utilizes a hands free display for the handler. In certain embodiments, the display on the handler's portion is incorporated in or mounted to a helmet.

In certain embodiments of the multipurpose canine camera system of the present disclosure, the handler is able to receive audio information from the canine. Receiving audio information from the canine is beneficial for a variety of different reasons. In conflict situations, the need to know what the canine is hearing is critical because, whenever possible, the canine enters buildings/rooms first. Having the ability to hear whether or not someone is talking in a room, and maybe being able to gain some tactical knowledge during the approach would be extremely beneficial. Being able to hear could alert personnel to potential booby traps, or give valuable information about how many people might be in the area and who may pose a potential threat. In certain embodiments, this could prevent any sort of issue during a surreptitious/silent clearance of a target objective. In non-conflict situations, such as search and rescue, the ability to hear where and how many people might be concealed and in need of assistance could be invaluable. In certain embodiments, a Peltor jack may be used on the handler's portion of the system. In certain embodiments of the system, the canine portion has a microphone. In certain embodiments of the system, the handler portion has a speaker.

In certain embodiments of the system, the canine is able to receive audio information from the handler. The ability to transmit commands over long distances and outside the line of sight can save canine and human lives. A simple scenario where this would be most valuable would be in the case that the canine is alone in a building indicating (sitting down, which is typically the response trained to react to explosive odor) the handler would not want to enter the building in this case. Being able to call the canine off an explosive via the present system would not only save the canine, but the people the canine is serving. In certain embodiments of the system, the handler portion has a microphone. In certain embodiments of the system, the canine portion has a speaker.

In certain embodiments of the canine communication system, visual information from the canine to the handler is provided by a camera. In certain embodiments, the camera captures and records data including, but not limited to, audio and video. In certain embodiments, the camera has thermal capability. In certain embodiments the camera simultaneously observes the target area in the infrared and thermal spectrum. In certain embodiments, where there is an explosive device, if the system uses imagery that outlines the heat signature that could allow personnel to see certain types of IEDs. The ability to see visual and thermal signatures of potential threats could mean the difference between a successful mission and suffering a preventable loss. In certain embodiments, the system utilizes a canine borne thermal imager that transmits secure, real-time video wirelessly to any mobile device for display. In certain embodiments, the system enhances operations of canine units in the military, municipalities, service and working dog industry, and various other government agencies both foreign and domestic.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for real-time, two-way communication between a handler and a canine, comprising:
   a handler portion, comprising:
     a display, wherein the display provides for control of one or more cameras of a canine portion including pan/tilt and zoom capabilities;
     a microphone and one or more speakers; and
     a power source;
   the canine portion, comprising:
     a vest;
     the one or more cameras being mounted on the vest, wherein the one or more cameras include thermal imaging capabilities and are configured to be operated and controlled by the handler portion and provide for transmitting video signals of the canine's head to the handler for non-verbal communication from the canine;
     a microphone and one or more speakers;
     one or more sensors; and
     a power source;
   two or more multi-channel transmitters, wherein a first transmitter is mounted on the canine portion and is configured to transmit signals from the canine portion to the handler portion and a second transmitter is mounted on the handler portion and is configured to transmit signals from the handler portion to the canine portion, the transmitters use RF frequencies; and
   two or more multi-channel receivers, wherein a first receiver is mounted on the canine portion and is configured to receive signals from the handler portion and a second receiver is mounted on the handler portion and is configured to receive signals from the canine portion, the receivers use RF frequencies;
   the two or more multi-channel transmitters transmit signals and the two or more multi-channel receivers receive signals over long distances and through hard structures.

2. The system of claim 1, wherein the one or more sensors comprises a GPS.

3. The system of claim 1, wherein the one or more sensors comprises sensors for monitoring the vital signs of the canine.

4. The system of claim 1, wherein the long distances are between 300 and 500 meters.

5. The system of claim 1, where the hard structures include a tunnel, a wall and glass.

6. The system of claim 1, wherein the two or more multi-channel transmitters and two or more multi-channel receivers are combined into two or more multi-channel transceivers.

7. The system of claim 1, wherein the display is a touch screen.

8. The system of claim 1, wherein the display is incorporated into ballistic glasses.

9. The system of claim 1, wherein each power source is rechargeable.

10. The system of claim 1, wherein a multi-channel system comprising the two or more multi-channel transmitter and the two or more multi-channel receivers automatically selects the frequency to use for two-way communication between handler and canine.

11. The system of claim 1, further comprising an IR strobe on the canine portion.

12. The system of claim 1, further comprising a camera mounted on a chest of a canine to provide 360° views.

13. A method of real-time, two-way communication between a handler and a canine, comprising:
   providing a handler portion, comprising:
     a display;
     a microphone and one or more speakers; and
     a power source;
   providing a canine portion, comprising:
     one or more cameras mounted on a vest;
     a microphone and one or more speakers;
     one or more sensors; and
     a power source;
   providing two or more multi-channel transmitters, wherein a first transmitter is mounted on the canine portion and is configured to transmit signals from the canine portion to the handler portion and a second transmitter is mounted on the handler portion and is configured to transmit signals from the handler portion to the canine portion, the transmitters use RF frequencies;
   providing two or more multi-channel receivers, wherein a first receiver is mounted on the canine portion and is configured to receive signals from the handler portion and a second receiver is mounted on the handler portion and is configured to receive signals from the canine portion, the receivers use RF frequencies;
   transmitting audio signals from the canine portion to the handler portion;
   transmitting sensor signals from the canine portion to the handler portion;
   transmitting video signals from the canine portion to the handler portion, including video signals of the canine's head for non-verbal communication from the canine;
   receiving, at the handler portion, signals transmitted from the canine portion;
   transmitting audio signals from the handler portion to the canine portion;
   receiving, at the canine portion, signals transmitted from the handler portion;
   recording and storing signals from the canine portion and the handler portion;
   controlling the camera on the canine portion using the display on the handler portion, including pan/tilt and zoom;
   determining the RF frequency for two-way communication between the canine portion and the handler portion;
   monitoring vital signs of the canine using the one or more sensors;

monitoring a position of the canine using the one or more sensors; and collecting data about an area where the canine is using the one or more sensors.

* * * * *